US012756638B2

(12) United States Patent
Chatterjee et al.

(10) Patent No.: US 12,756,638 B2
(45) Date of Patent: Oct. 6, 2026

(54) DATA USAGE CATEGORIZATION IN TELECOMMUNICATION NETWORK

(71) Applicant: RAKUTEN MOBILE, INC., Tokyo (JP)

(72) Inventors: Gaurav Chatterjee, Tokyo (JP); Md Nurul Amin, Tokyo (JP); Rajib Chakrabarti, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 61 days.

(21) Appl. No.: 18/901,746

(22) Filed: Sep. 30, 2024

(65) Prior Publication Data

US 2026/0095394 A1 Apr. 2, 2026

(51) Int. Cl.
*G06F 15/173* (2006.01)
*H04L 41/50* (2022.01)
*H04L 43/065* (2022.01)
*H04W 80/04* (2009.01)

(52) U.S. Cl.
CPC ............ *H04L 41/50* (2013.01); *H04L 43/065* (2013.01); *H04W 80/04* (2013.01)

(58) Field of Classification Search
CPC ....... H04L 41/50; H04L 43/065; H04W 80/04
See application file for complete search history.

(56) References Cited

U.S. PATENT DOCUMENTS 8,676,937 B2 * 3/2014 Rapaport .............. H04L 67/306 709/219
2013/0171964 A1 * 7/2013 Bhatia .................. H04W 12/08 455/411
2014/0215557 A1 * 7/2014 Vishnubhatt ............ H04L 63/10 726/3
2015/0011179 A1 * 1/2015 Won ........................ H04W 4/80 455/405
2022/0046417 A1 * 2/2022 Pazhyannur ........ H04L 63/0853
2022/0239746 A1 * 7/2022 Yan ....................... H04M 15/61
2025/0292680 A1 * 9/2025 Naes ...................... G08G 1/012
2026/0020037 A1 * 1/2026 Vivanco .............. H04W 72/231

* cited by examiner

*Primary Examiner* — Phuoc H Nguyen
(74) *Attorney, Agent, or Firm* — Sughrue Mion, PLLC

(57) ABSTRACT

Example embodiments of the present disclosure relate to the categorization of data usage in a telecommunication network. According to example embodiments, a system may be configured to obtain, from a core network of a telecommunication network, information of an internet protocol (IP) address associated with a user equipment (UE) in the telecommunication network and information of data usage associated with the UE. Subsequently, the system may be configured to categorize, based on the IP address, the data usage into a parent category and a child category. The parent category may be associated with data usage in a non-tethering operation and the child category may be associated with data usage in a tethering operation. Accordingly, the system may provide, based on the categorization of the data usage, a service to the UE.

20 Claims, 7 Drawing Sheets

300

| IMSI | Parent IP | Parent 5G Vol. (MB) | Parent 4G Vol. (MB) | Child IP | Child Count | Child 5G Vol. (MB) | Child 4G Vol. (MB) |
|---|---|---|---|---|---|---|---|
| 440111*** | Parent IP 1 | 0.51 | 0.49 | [Ch IP 1, CH IP 2, Ch IP 3, and Ch IP 4] | 4 | 7822 | 0 |
| 440114*** | Parent IP 2 | 3595 | 0 | [Ch IP 5 and Ch IP 6] | 2 | 2 | 3 |
| 440116*** | Parent IP 3 | 1000 | 1000 | N/A | 0 | 0 | 0 |
| 440118*** | Parent IP 4 | 0 | 2000 | N/A | 0 | 0 | 0 |

FIG. 3

DATA USAGE CATEGORIZATION IN TELECOMMUNICATION NETWORK

TECHNICAL FIELD

The present disclosure relates to the categorization of data usage in a telecommunication network.

BACKGROUND

The information disclosed in this background section is only for the enhancement of understanding of the general background of the disclosure and should not be taken as an acknowledgement or any form of suggestion that this information forms the prior art already known to a person skilled in the art.

In a telecommunication network, a user may access the network to perform various operations via a device or user equipment (UE). For instance, the user may access the internet, may communicate with another user, may utilize a service, and the like, by accessing the network via the UE. The communication between the network and the user device may involve transmission and reception of data (in the form of data packets) over cellular networks (e.g., fourth generation (4G) network, fifth generation (5G) network, etc.), fixed broadband connections (e.g., fiber optic, cable, etc.), or a combination thereof.

Data usage of the users in the telecommunication network is an important metric for both the users and the network operators as it is associated with network planning, billing, service quality, and overall user experience. In this regard, the data usage may vary according to the operations or activities the users are performing and the technologies involved therein. Among others, the data usage for tethering operations and non-tethering operations may vary significantly. Specifically, tethering refers to the sharing of a device's network connection with other devices (e.g., a mobile phone may enable tethering features to act as a gateway or router for sharing internet connection to other mobile phones, etc.), while non-tethering refers to a device using its own network connection without sharing it with other devices. Accordingly, the data usage in tethering operations can be significantly larger than the data usage in non-tethering operations.

Additionally, the data usage of in tethering/non-tethering operations may also be affected by the utilized network technologies, due to the inherent differences in data transmission speed, capacity, efficiency, and features enabled by the different network technologies. For instance, the tethering operations performed via 5G network may result in larger volume of data usage as compared to the tethering operations performed via 4G network, since 5G network may enable faster data transmission speeds and higher bandwidth that allow more data consumption.

SUMMARY

Example embodiments of the present disclosure provide systems, apparatuses, methods, and the like, that provide data usage categorization in a telecommunication network.

According to example embodiments, a system may be configured to obtain, from a core network of a telecommunication network, information of an internet protocol (IP) address associated with a user equipment (UE) in the telecommunication network and information of data usage associated with the UE. Subsequently, the system may be configured to categorize, based on the IP address, the data usage into a parent category and a child category. The parent category may be associated with data usage in a non-tethering operation and the child category may be associated with data usage in a tethering operation. Accordingly, the system may provide, based on the categorization of the data usage, a service to the UE.

According to example embodiments, a method may include: obtaining, from a core network of a telecommunication network, information of an IP address associated with a UE in the telecommunication network and information of data usage associated with the UE, and categorizing, based on the IP address, the data usage into a parent category and a child category. The parent category may be associated with data usage in a non-tethering operation and the child category may be associated with data usage in a tethering operation. Further, the method may include providing, based on the categorization of the data usage, a service to the UE.

According to example embodiments, a non-transitory computer-readable recording medium having recorded thereon instructions executable by a system to cause the system to perform a method. The method may include: obtaining, from a core network of a telecommunication network, information of an IP address associated with a UE in the telecommunication network and information of data usage associated with the UE, and categorizing, based on the IP address, the data usage into a parent category and a child category. The parent category may be associated with data usage in a non-tethering operation and the child category may be associated with data usage in a tethering operation. Further, the method may include providing, based on the categorized data usage, an optimized service to the UE.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects, and advantages of embodiments of the disclosure will be described below with reference to the accompanying drawings, in which like reference numerals denote like elements, and wherein:

FIG. 3 illustrates a table of an example use case, according to one or more example embodiments;

DETAILED DESCRIPTION

Figure 1:
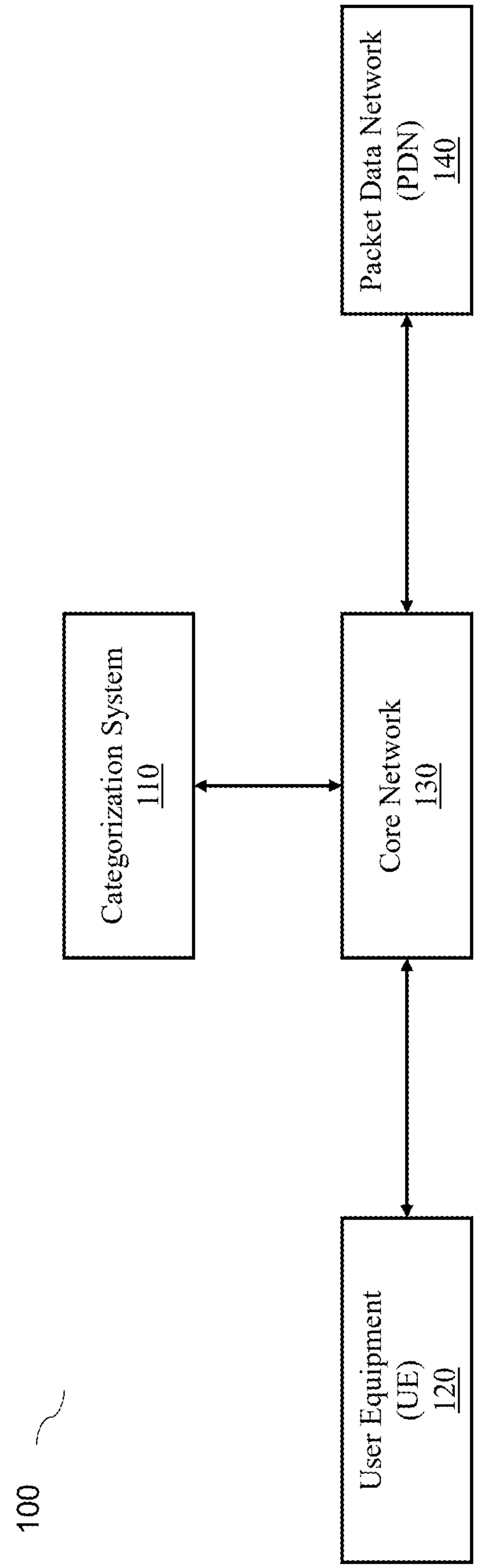
FIG. 1 illustrates a block diagram of an example system architecture, according to one or more example embodiments.

The following detailed description of example embodiments refers to the accompanying drawings. The foregoing disclosure provides illustration and description, but is not intended to be exhaustive or to limit the implementations to the precise forms disclosed. Modifications and variations are possible in light of the above disclosure or may be acquired from practice of the implementations. Further, one or more features or components of one embodiment may be incorporated into or combined with another embodiment (or one or more features of another embodiment). Additionally, the flowchart and description of operations provided below relate to one of the various embodiments. It should be noted that it is possible to make other embodiments that do not exactly match the flowchart and its description. It is understood that in other embodiments one or more operations may be omitted, one or more operations may be added, one or more operations may be performed simultaneously (at least in part).

It will be apparent that systems and/or methods, described herein, may be implemented in different forms of hardware, firmware, or a combination of hardware and software. The actual specialized control hardware or software code used to implement these systems and/or methods is not limited to the described implementations. Thus, the operation and behavior of the systems and/or methods are described herein without reference to specific software code. It is understood that software and hardware may be designed to implement the systems and/or methods based on the description herein.

Even though particular combinations of features are disclosed in the claims and/or in the specification, these combinations are not intended to limit the disclosure of implementations. In fact, many of these features may be combined in ways not specifically recited in the claims and/or disclosed in the specification. Although each dependent claim listed below may directly depend on only one claim, the disclosure of implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]", "[A] and/or [B]", or "at least one of [A] or [B]", are to be understood as including only A, only B, or both A and B.

It shall be noted that, descriptions of example embodiments of the present disclosure may include terms and names defined in one or more standard organizations, such as the 3rd Generation Partnership Project (3GPP) standard organization, the European Telecommunications Standards Institute (ETSI) standard organization, the Open Radio Access Network (O-RAN) Alliance standard organization, and the like. For instance, the terms "eNodeB", "gNodeB", "PDN", "EPC", "SGW", "PGW", "MME", and the like, as well as the associated features and operations, are to be interpreted as consistent with those specified in one or more technical specifications, unless being described otherwise.

The data usage of the users in a telecommunication network is an important metric in optimizing network management, constructing billing policies, enhancing user experience, and providing services to targeted users. For instance, the information on user data usage in tethering/non-tethering operations (e.g., how many users are utilizing the 5G network for tethering operations, how many users are consuming non-tethering data, etc.) enables the network operators to manage network resources effectively, determine suitable services and provide them to the most relevant users, and offer differentiated services to the specific users.

Nevertheless, in the related art, it is difficult to effectively and accurately categorize the data usage, as well as the associated users, due to several reasons. To begin with, the user data usage in a telecommunication network can occur across multiple dimensions, and thus the user data usage may reflect various simultaneous activities. For instance, a UE may consume both tethering and non-tethering data simultaneously, when the UE is using data for its own applications (e.g., browsing the internet, etc.) that consumes non-tethering data, while also sharing its network connection to other devices which results in the consumption of tethering data.

In addition, user data consumption may also occur across different network types. For instance, a UE under a dual-connectivity mode may be connected to both the 4G network and the 5G network simultaneously. In this regard, if the UE is tethering while in the dual-connectivity mode, the data consumed by the UE may include, for example, 4G data usage for tethering operations, 5G data usage for tethering operations, 4G data usage for non-tethering operations, and/or 5G data usage for non-tethering operations. The overlapping of the multiple dimensions (e.g., tethering versus non-tethering, 4G versus 5G, etc.) increases the complexity and difficulty to accurately categorizing the data usage and the associated users.

Further, in the related art, the users are broadly categorized based on occasion or limited behavior, instead of their typical or sustained usage patterns. For instance, a user who engages in tethering operations only once or infrequently and a user who frequently engages in tethering operations may both be categorized into the category of a "tethering user".

In view of the above, the categorization systems and approaches in the related art are unable to effectively, efficiently, and accurately categorize data usage and the associated users in a telecommunication network. This in turn results in suboptimal service quality and network resource allocation (e.g., users may be incorrectly grouped into a category that inaccurately prioritizes/deprioritizes their network usage, etc.), an inability to efficiently and accurately provide a targeted or optimized service based on the category of data usage (e.g., an optimized service targeted for users that utilize tethering frequently), excess overhead in offering or providing services (e.g., the excess network/bandwidth overhead used to broadcast, offer or provide a tethering-related service to miscategorized users), inability or difficulty in providing an alert according to the type of data usage, inability or difficulty in providing comprehensive and detailed data usage information to the users, etc.

Example embodiments of the present disclosure provide a system, a method, a device, and the like, that effectively, efficiently, and accurately categorize data usage and the associated users in a telecommunication network. As further described below, example embodiments of the present disclosure provide a system that may utilize the information of IP address(s) associated with a UE to categorize the data usage of the UE into multiple categories (and sub-categories, in some example implementations). Further, the categorization system may execute an approximate reasoning algorithm (e.g., a fuzzy-logic algorithm) to categorize the users. Accordingly, the categorization system may take into consideration information or data from multiple dimensions when categorizing the data usage and the associated users, thereby increasing the accuracy, efficiency, and effectiveness of the categorization. Subsequently, the categorized information (e.g., categorized data usage, categorized user, etc.) may be utilized to provide an optimized or targeted service to the UE based on the category of the data and/or the category of the user (e.g., a service optimized or targeted for tethering operation can be provided to users that use tethering frequently, etc.) thereby enhancing the user experience and optimizing network resource allocation, avoiding excess overhead in offering or providing services and optimizing network resource consumption (e.g., broadcasting, offering, or providing of services to miscategorized users can be avoided, etc.), providing or triggering a data usage alert according to the type of data usage and/or the type of the user (e.g., provide/trigger a first alert when the tethering data usage exceeds a first limit/first threshold, provide/trigger a second alert when the total amount of data usage of a non-tethering user exceeds a second limit/second threshold, etc.), and providing comprehensive and detailed data usage information to the users (e.g., provide detailed information on how much tethering data and non-tethering data have been consumed, etc.)

It is contemplated that features, advantages, and significances of example embodiments described hereinabove are merely a portion of the present disclosure, and are not intended to be exhaustive or to limit the scope of the present disclosure. Further descriptions of the features, components, configuration, operations, and implementations of the example embodiments of the present disclosure are provided in the following.

Example System Architecture

FIG. 1 illustrates a block diagram of an example system architecture 100, according to one or more example embodiments. As illustrated in FIG. 1, the system architecture 100 may include a categorization system 110, a user equipment (UE) 120, a core network 130, and a packet data network (PDN) 140. It is contemplated that the system architecture in FIG. 1 is simplified for descriptive purposes, and the actual system architecture may be different from FIG. 1 in actual implementations. For instance, in some example implementations, the system may include more components, such as multiple UEs, multiple core networks, multiple PDNs, and the like, without departing from the scope of the present disclosure.

Generally, the UE 120 may be utilized by a user (e.g., a subscriber of the telecommunication network) to access the PDN 140 and utilize a service provided by the PDN 140. In this regard, the UE 120 may communicatively couple to the core network 130 to thereby access the PDN 140. The communication between the UE 120, the core network 130, and the PDN 140 may be performed in the form of data transmission.

When the UE 120 attempts an initial attach to the core network 130, the core network 130 will allocate an Internet Protocol (IP) address to the UE 120. The IP address can include, for example, an IP version 4 (IPv4) address, an IP version 6 (IPv6) address, or a combination thereof. Subsequently, the core network 130 may establish a bearer that connects the UE 120 and the core network 130, such that the UE 120 may utilize the assigned IP address to send/receive data and utilize services provided by the PDN 140. The established bearer remains connected (i.e., the IP address assigned to the UE 120 during the initial attach remains valid) until the UE 120 is detached from the core network 130.

In this regard, the categorization system 110 may communicatively couple to the core network 130 to obtain information associated with the UE 120 and then perform one or more operations to categorize the data usage of the UE 120 and the associated user. Specifically, according to example embodiments, the categorization system 110 may obtain, from the core network 130, information of an IP address associated with the UE (e.g., IP address preassigned to the user, IP address allocated to tethered devices when the UE is in tethering mode, etc.) and information of data usage associated with the UE, and then categorize the data usage (e.g., data usage in a tethering operation, data usage in a non-tethering operation, etc.) based on the obtained information. Furthermore, the categorization system 110 may execute an approximate reasoning algorithm (e.g., fuzzy-logic algorithm) to categorize the user (e.g., tethering user, potential tethering user, non-tethering user, etc.) Accordingly, the categorization system 110 may provide, based on the categorized information (e.g., information of the categorized data usage, information of the categorized user, etc.) a service to the user. Example operations performable by the categorization system 110 are further described below with reference to FIGS. 2A-5B. In addition, one or more operations of the categorization system 110 may be implemented by one or more hardware components. Descriptions of example components of the categorization system 110 are provided below with reference to FIG. 6.

The UE 120 may refer to any device utilized by an end-user of the telecommunication network (e.g., network subscriber, etc.) to access the network. For instance, the UE 120 may include at least one of: a mobile device (e.g., a smartphone, a laptop, a tablet, a wearable device like smartwatches and smartglasses, a portable hotspot, etc.), a static device (e.g., a fixed wireless access (FWA) router, an internet modem, an Internet of Things (IoT) device like a security camera, sensors, and smart home devices, etc.), and the like. Further, the UE 120 may include a device that is capable of performing tethering operation (i.e., a device that can be configured to share its network connection to other devices), a device that is not capable of performing tethering operation, a device that is capable of connecting only to the 4G network, a device that is capable of connecting to both 4G network and 5G network, and the like.

The PDN 140 may refer to an external network that provides a service to the UE 120. For instance, the PDN 140 may include the internet, a corporate intranet, or any public/private network that offers specific services. According to example embodiments, the PDN 140 may be identified by an associated access point name (APN) in the 4G network and/or an associated data network name (DNN) in the 5G network. Further, the PDN 140 may communicate with the core network 130 for data packet forwarding, traffic management, and policy enforcement.

The core network 130 may be configured to manage or control the connectivity, mobility, session management, and data routing between the UE 120 and the PDN 140. According to example embodiments, the core network 130 may include an evolved packet core (EPC) network that may be utilized in the 4G network or the 5G network (in 5G non-stand-alone (NSA) mode). Additionally or alternatively, the core network 130 may include a 5G core (5GC) network that may be utilized in the 5G network (in 5G stand-alone (SA) mode). For descriptive purposes, the core network is described as a 4G EPC network in the following descriptions, although it is contemplated that the EPC network may be replaced by a 5GC network, without departing from the scope of the present disclosure.

Figure 2A:
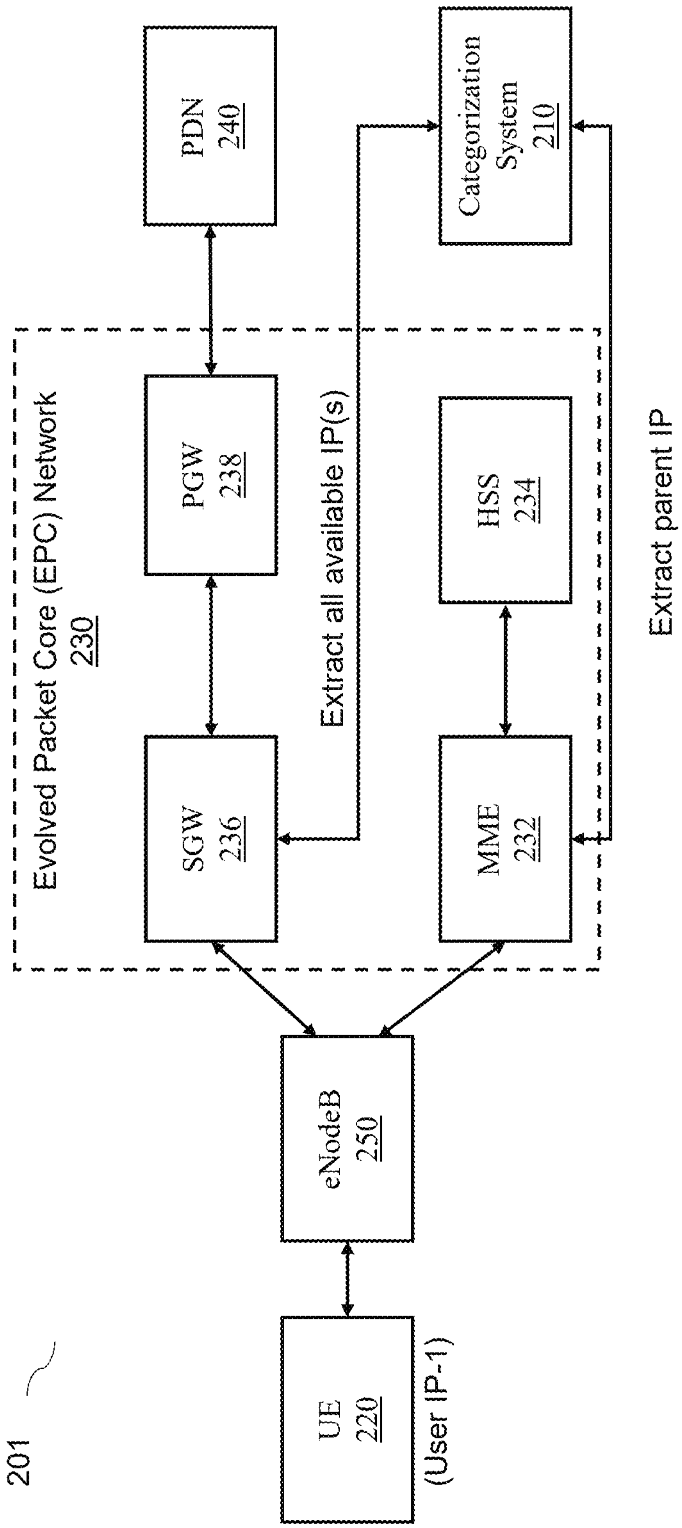
FIG. 2A illustrates a block diagram of an example system configuration that involves a 4G EPC network and a UE in non-tethering mode, according to one or more example embodiments.

FIG. 2A illustrates a block diagram of an example system configuration 201 that involves a 4G EPC network and a UE in non-tethering mode, according to one or more example embodiments. As illustrated in FIG. 2A, the example system configuration 201 involves a categorization system 210, a UE 220, an EPC network 230, a PDN 240, and an eNodeB 250. In this regard, it is contemplated that the descriptions associated with the categorization system 110, the UE 120, the core network 130, and the PDN 140 in FIG. 1 may be similarly applicable to the categorization system 210, the UE 220, the EPC 230, and the PDN 240 in FIG. 2, respectively.

In this example configuration, the UE 220 is in non-tethering mode (i.e., the UE 220 is not sharing its network connection with other devices) and is communicatively coupled to the EPC network 230 via the eNodeB 250. In this regard, the eNodeB 250 may refer to a base station in the 4G network that handles the radio communication between the UE 220 and the EPC network 230. For instance, the eNodeB 250 may perform radio resource management, scheduling, and handovers, to thereby establish and maintain the wireless communication link between the UE 220 and the EPC network 230.

As illustrated in FIG. 2A, the EPC network 230 may include a mobility management entity (MME) 232, a home subscriber server (HSS) 234, a serving gateway (SGW) 236, and a packet data network gateway (PGW) 238. According to example embodiments, one or more of the MME 232, HSS 234, SGW 236, and PGW 238 (as well as the operations associated therewith) may be implemented in one or more devices (e.g., one or more servers, etc.) For instance, one or more of the MME 232, HSS 234, SGW 236, and PGW 238 (as well as the operations associated therewith) may be implemented as a software application(s) or virtualized/containerized network function(s) operating on the one or more devices, in a virtualized environment and the like.

The MME 232 may be responsible for providing mobility and session management for the users (i.e., the network subscribers). For example, the MME 23 may handle operations such as user authentication, handovers between network cells, location updates, establishment and release of bearers, and the like.

The HSS 234 may be a central server or database that stores and manages user-related and subscription-related information. For instance, the HSS 234 may store and manage information of the international mobile subscriber identity (IMSI) and the associated IP address assigned to the users/subscribers when they first subscribe to the network. The HSS 234 may provide the information and credentials of the users/subscribers to the MME 232 for user authentication and mobility management.

The SGW 236 may be responsible for handling the user plane data traffic between the UE 220 and the PGW 238. For instance, the SGW 236 may route and forward user data packets between the eNodeB 250 and the PGW 238, managing bearer paths, and performing data-related operations (e.g., data filtering, etc.)

The PGW 316 may be responsible for managing the connection of the network to the PDN 240. For example, the PGW 238 may allocate an IP address to the UE 220, perform data packet filtering, provide quality of service (QoS) management, and collect data for billing or charging purposes.

In this regard, when the UE 220 is powered on or attempts an initial attach to the network to access the PDN 240, the UE 220 may send a request message (e.g., an Attach Request message, a PDN Connectivity Request message, etc.) to the eNodeB 250. This request message may include the IMSI information associated with the UE 220 (or an associated globally unique temporary identifier (GUTI), if available) and the information associated with the PDN 240 (e.g., APN/DNN of the PDN, PDN type such as IPv4 and/or IPv6, etc.)

Upon receiving the request message from the UE 220, the eNodeB 250 may forward the request message to the MME 232. Accordingly, the MME 232 may communicate with the HSS 234 to authenticate the UE 220. For instance, the MME 232 may obtain the user-related and subscription-related information from the HSS 234 and then utilize this information to perform operations to authenticate the UE 220 (e.g., send an Authentication Request message to the UE 220, receive an Authentication Response message from the UE 220, etc.)

Upon successful authentication (and any other required security procedures, if any), the MME 232 may send a request message (e.g., a Create Session Request message, etc.) to the SGW 236 to create a session for the UE 220. This request message may include the information associated with the UE 220 (e.g., IMSI, preassigned IP address, etc.) and the information associated with the PDN 240 (e.g., APN, PDN type, etc.) Accordingly, the SGW 236 may forward the request message to the PGW 238.

Upon receiving the request message, the PGW 238 may allocate the parameters or information required for establishing a session. For instance, the PGW 238 may determine the QoS rules or policies to be applied to the session. In some example embodiments, the MME 232 may send the request message without including the information of the preassigned IP address (e.g., the MME 232 does not obtain the information of the preassigned IP address from the HSS 234). In this case, upon receiving the request message, the PGW 238 may communicate with the HSS 234 to obtain the information of the preassigned IP address.

Accordingly, the PGW 238 may send, to the SGW 236, a response message (e.g., a Create Session Response message, etc.) that includes information of the QoS policies/rules, bearer context information, and/or the preassigned IP address. Subsequently, the SGW 236 may forward the response message to the MME 232, and the MME 232 may send an Attach Accept message (that includes the information of the preassigned IP address, etc.) to the UE 220 via the eNodeB 250. Upon receiving the Attach Accept message, the UE 230 may response with an Attach Complete message to the MME 232 (via the eNodeB 250) to acknowledge the successful attachment. At this point, a bearer is established between the UE 220 and the PGW 238 (via the eNodeB 250 and the SGW 236) to carry user data traffic, and the UE can utilize the preassigned IP address (illustrated as "User IP-1" in FIG. 2A) to communicate with the PDN 240 and send/receive data therewith.

Figure 2B:
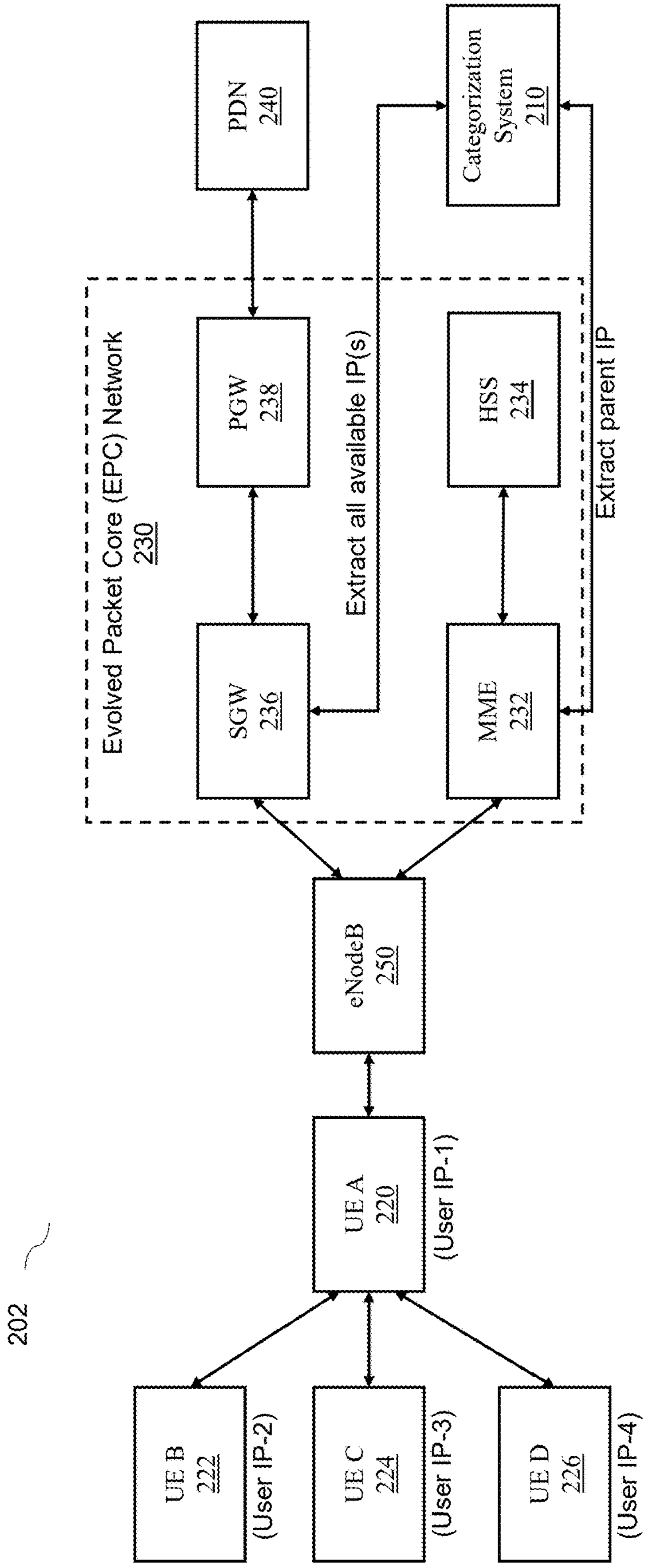
FIG. 2B illustrates a block diagram of another example system configuration that involves a 4G EPC network and a UE in tethering mode, according to one or more example embodiments.

FIG. 2B illustrates a block diagram of another example system configuration 202 that involves a 4G EPC network and a UE in tethering mode, according to one or more example embodiments. As illustrated in FIG. 2B, this example system configuration 202 involves components like the categorization system 210, the UE 220, the EPC network 230, the PDN 240, and the eNodeB 250, which are similar to those in the example system configuration 201 of FIG. 2A.

In this example configuration, the UE 220 is in tethering mode and is sharing its network connection with other devices. For descriptive purposes, a device that is in tethering mode and sharing its network connection (e.g., UE 220) may be referred to as a "parent device" or a "primary device" and is illustrated as "UE A" in FIG. 2B, while the devices that are connecting to the network via the parent device/primary device may each be referred to as a "child device" or a "tethered device" and are illustrated as "UE B", "UE C", and "UE D", respectively, in FIG. 2B.

In this regard, when the child devices (e.g., UE B to UE D) connect to the network through the parent device (e.g., UE A), they may rely on the parent device (e.g., UE A) to transmit data to the EPC 230 and receive data from the EPC 230. Specifically, when a child device attempts to attach to the network to access the PDN 240, the child device may send a request message (e.g., an Attach Request message, a PDN Connectivity Request message, etc.) to the parent device. The parent device may forward this request message to the MME 232 via the eNodeB 250. Accordingly, the MME 232 may interact with the SGW 236 and the PGW 238 to assign an IP address to the child device. For descriptive purposes, the IP address assigned to the parent device (when the user first subscribes to the network) may be referred to as the "parent IP address" while the IP address assigned to the child device may be referred to as the "child IP address". For instance, the "User IP-1" in FIG. 2B is a parent IP address while the "User IP-2", "User IP-3", and "User IP 4" in FIG. 2B are child IP addresses. It is contemplated that the IP addresses may be presented in any suitable form or labeling, without departing from the scope of the present disclosure. For instance, as further described below with reference to FIG. 3, a parent IP address may be presented in the form of "Parent IP X" (e.g., Parent IP 1, Parent IP 2, etc.), while a child IP address may be presented in the form of "Ch IP X" (e.g., Ch IP 1, Ch IP 2, etc.).

Upon assigning the child IP address to the child device, a separate session and a new bearer may be established for the child device. With the child device having its own IP address, the SGW 236 and the PGW 238 may handle the data traffic for the child device separately from the parent device. For instance, the SGW 236 and the PGW 238 may manage the data flows individually for each parent IP address and child IP address, thereby applying policy control and monitoring the data usage volume of each of the parent device and child device.

In this regard, the categorization system 210 may continuously (or periodically) communicate with the EPC network 230 to obtain information of one or more of the UEs (e.g., information of an IP address associated with a UE, information of data usage associated with the UE, etc.) and perform one or more operations to categorize the data usage and/or the user associated with the one or more UEs.

According to example embodiments, the categorization system 210 may obtain, from the MME 232 via an S1-Control Plane (S1-C) interface, a parent IP address associated with the user. For instance, the categorization system 210 may request the MME 232 to provide one or more parent IP addresses (i.e., one or more IP addresses preassigned to one or more users and stored in the HSS 234). In this case, the MME 232 may obtain the available IP addresses from the HSS 234 and provide the requested IP addresses (along with the information of the associated users like the IMSI, etc.) to the categorization system 210. In some example embodiments, the categorization system 210 may request the MME 232 to provide a parent IP address of a specific user/UE. For instance, the categorization system 210 may send a request message that includes a specific IMSI to the MME 232. In this case, the MME 232 may search and obtain the parent IP address that is associated with the provided IMSI from the HSS 234 and then provide the same to the categorization system 210.

According to example embodiments, the categorization system 210 may obtain, from the SGW 236 via an S1-User Plane (S1-U) interface, a child IP address associated with the parent IP address (obtained from the MME 232). For instance, the categorization system 210 may obtain, from the SGW 236, all available IP addresses, and then determine whether the available IP addresses include any IP address(s) that is associated with the parent IP address. In some example embodiments, the categorization system 210 may request the SGW 236 to provide all IP addresses associated with a specific user/UE. For instance, the categorization system 210 may send a request message that includes a specific IMSI to the SGW 236. In this case, the SGW 236 may search and obtain any IP address(s) associated with the provided IMSI from the PGW 238 and then provide the same to the categorization system 210. Accordingly, the categorization system 210 may determine whether or not the available IP address(s) provided by the SGW 236 includes any child IP address(s) that is associated with the parent IP address, and then extract the child IP address(s) from the available IP address(s), if any.

In the example configuration 201 of FIG. 2A, since the UE 220 is in non-tethering mode, the information of the IP address provided by both the MME 232 and the SGW 236 only includes the information of the parent IP address ("User IP-1"). Conversely, in the example configuration 202 of FIG. 2B, since the UE 220 is in tethering mode, the information of the IP address provided by the MME 232 includes the information of the parent IP address ("User IP-1") while the information of the IP address provided by the SGW 236 includes all associated IP addresses (i.e., parent IP address "User IP-1", child IP address "User IP-2", child IP address "User IP-3", and child IP address "User IP-4").

According to example embodiments, the categorization system 210 may also obtain, from the SGW 236 via the S1-U interface, information associated with the data usage of the user. For instance, when obtaining information of the IP address(s) from the SGW 236, the categorization system 210 may also request the SGW 236 to provide information of data usage associated with each of the IP address(s).

According to example embodiments, the categorization system 210 may categorize, based on the IP address of the UE, the data usage of a UE into the respective category. For instance, the categorization system 210 may categorize the data usage of the UE into a parent category that is associated with data usage in a non-tethering operation (e.g., data usage of the UE when the UE is in non-tethering mode) and a child category that is associated with data usage in a tethering operation (e.g., data usage of the UE when the UE is in tethering mode).

According to example embodiments where the IP address obtained from the EPC network 230 includes both the parent IP address and the child IP address, the categorization system 210 may determine which portion of the data usage is associated with the parent IP address and which portion of the data usage is associated with the child IP address, and then categorize the data usage based thereon. For instance, the categorization system 210 may determine a first portion of the data usage that is associated with the parent IP address and a second portion of the data usage that is associated with the child IP address, and then categorize the first portion of the data usage into the parent category (i.e., data usage in the non-tethering operation) and the second portion of the data usage into the child category (i.e., data usage in the tethering operation).

According to example embodiments, the parent category may include a first sub-category that is associated with 5G data usage in the non-tethering operation (i.e., data consumed by the UE in the 5G network when the UE is in non-tethering mode) and a second sub-category that is associated with 4G data usage in the non-tethering operation (i.e., data consumed by the UE in the 4G network when the UE is in the non-tethering mode). In this case, the categorization system 210 may further categorize the data usage associated with the parent category into the respective sub-category. For instance, the categorization system 210 may further determine which portion of the data usage is associated with the 5G data usage in non-tethering mode and which portion of the data usage is associated with the 4G data usage in non-tethering mode, and then categorize the determined portions of data usage into the respective sub-category.

Additionally or alternatively, the child category may include a first sub-category that is associated with 5G data usage in the tethering operation (i.e., data consumed by the UE in the 5G network when the UE is in tethering mode) and a second sub-category that is associated with 4G data usage in the tethering operation (i.e., data consumed by the UE in the 4G network when the UE is in tethering mode). In this case, the categorization system 210 may further categorize the data usage associated with the child category into the respective sub-category. For instance, the categorization system 210 may further determine which portion of the data usage is associated with the 5G data usage in tethering mode and which portion of the data usage is associated with the 4G data usage in tethering mode, and then categorize the determined portions of data usage into the respective sub-category.

According to example embodiments, the categorization system 210 may compile the information or results of the categorization into a table. FIG. 3 illustrates a table 300 of an example use case, according to one or more example embodiments.

In the example use case of FIG. 3, it is assumed that information associated with four parent devices has been categorized by the categorization system 210. Each of the parent devices has a specific IMSI and a parent IP address assigned thereto. The categorization system 210 has also categorized the data usage of each device into the respective sub-categories.

Referring to FIG. 3, in this example use case, the first parent device (i.e., the device with IMSI of "440111*" and parent IP address of "Parent IP 1") has consumed data in both tethering mode (e.g., the child devices tethered through the first parent device has consumed data under the 5G network) and non-tethering mode (e.g., the first parent device itself has consumed data under both 5G network and 4G network), while majority of the data is consumed in the tethering mode. As also illustrated in FIG. 3, the first parent device has four associated child devices, each of which has a child IP address associated therewith (e.g., a first child device has a child IP address of "Ch IP 1", a second child device has a child IP address of "Ch IP 2", a third child device has a child IP address of "Ch IP 3", and a fourth child device has a child IP address of "Ch IP4"). The second parent device (i.e., the device with IMSI of "440114*" and parent IP address of "Parent IP 2") has consumed data in both tethering mode (e.g., the child devices tethered through the second parent device has consumed data under both 5G network and 4G network) and non-tethering mode (e.g., the second parent device itself has consumed data under the 5G network), while majority of the data is consumed in the non-tethering mode. The second parent device has two associated child devices, each of which has a child IP address associated therewith (e.g., a first child device has a child IP address of "Ch IP 5", and a second child device has a child IP address of "Ch IP 6"). The third parent device (i.e., the device with IMSI of "440116*" and parent IP address of "Parent IP 3") has consumed data in non-tethering mode (e.g., the third parent device itself has consumed data under both 5G network and 4G network). The fourth parent device (i.e., the device with IMSI of "440118*" and parent IP address of "Parent IP 4") has consumed data in non-tethering mode (e.g., the fourth parent device itself has consumed data under the 4G network).

As described above with reference to FIG. 2, upon receiving the information of the IP addresses and data usage, the categorization system may first categorize the total data usage associated the each of the parent devices into a parent category and a child category, and then further categorized into a plurality of sub-categories (illustrated as "Parent 5G Vol.", "Parent 4G Vol.", "Child 5G Vol.", and "Child 4G Vol." in FIG. 3).

For instance, in this example use case, the total data usage associated with the first parent device is 7823 MB. In this regard, the categorization system may first determine that 1 MB out of the 7823 MB is associated with the parent IP address (and thus this 1 MB data usage is the data usage in non-tethering operation) and 7822 MB out of the 7823 MB is associated with the child IP addresses (and thus this 7822 MB data usage is the data usage consumed by the child devices in tethering operation). Subsequently, the categorization system may further determine that 0.51 MB out of the 1 MB data usage in non-tethering operation is 5G data usage (i.e., the first parent device has consumed 0.51 MB of data in the 5G network under non-tethering mode) and 0.49 MB out of the 1 MB data usage in non-tethering operation is 4G data usage (i.e., the first parent device has consumed 0.49 MB of data in the 4G network under non-tethering mode). Similarly, the categorization system may further determine that all of the 7822 MB data usage in tethering operation is 5G data usage (i.e., the child devices associated with the first parent device have consumed 7822 MB of data in the 5G network via the first parent device and none of the 7822 MB data is consumed in the 4G network.)

As another example, the total data usage associated with the second parent device is 3600 MB. In this regard, the categorization system may first determine that 3595 MB out of the 3600 MB is associated with the parent IP address (and thus this 3595 MB data usage is the data usage in non-tethering operation) and 5 MB out of the 3600 MB is associated with the child IP addresses (and thus this 5 MB data usage is the data usage consumed by the child devices in tethering operation). Subsequently, the categorization system may further determine that all of the 3595 MB data usage in non-tethering operation is 5G data usage (i.e., the second parent device has consumed 3595 MB of data in the 5G network under non-tethering mode and does not consume data in the 4G network under non-tethering mode). Similarly, the categorization system may further determine that 2 MB out of the 5 MB data usage in tethering operation is 5G usage data (i.e., the child devices associated with the second parent device have consumed 2 MB of data in the 5G network via the second parent device) and 3 MB out of the 5 MB data usage in tethering operation is 4G usage data (i.e., the child devices associated with the second parent device have consumed 3 MB of data in the 4G network via the second parent device).

As yet another example, the total data usage associated with the third parent device is 2000 MB. In this regard, the categorization system may first determine that all of the 2000 MB data usage is associated with the parent IP address (and thus all data usage of the third parent device is the data usage in non-tethering operation and the third parent device has not shared its network connection to any child device). Subsequently, the categorization system may further determine that 1000 MB of the 2000 MB data usage in non-tethering operation is 5G data usage (i.e., the third parent device has consumed 1000 MB of data in the 5G network under non-tethering mode) and another 1000 MB of the 2000 MB data usage in non-tethering operation is 5G data usage (i.e., the third parent device has consumed 1000 MB of data in the 4G network under non-tethering mode).

As yet another example, the total data usage associated with the fourth parent device is 2000 MB. In this regard, the categorization system may first determine that all of the 2000 MB data usage is associated with the parent IP address (and thus all data usage of the fourth parent device is the data usage in non-tethering operation and the third parent device has not shared its network connection to any child device). Subsequently, the categorization system may further determine that all of the 2000 MB data usage in non-tethering operation is 4G data usage (i.e., the fourth parent device has consumed 2000 MB of data in the 4G network and none of the 2000 MB data is consumed in the 5G network).

It is contemplated that the table 300 in FIG. 3 and the contents thereof are only one possible embodiment for an example use case, and the scope of the present disclosure should not be limited thereto. Specifically, in addition to or in alternative to the network type (e.g., 4G, 5G, etc.), the categorization system may categorize the user data usage into any other suitable sub-category according to, for example, the application type (e.g., content streaming application, social media application, etc.), the connection timing (e.g., peak hours, off-peak hours, etc.), the geographical location (e.g., data usage in urban areas, data usage in rural areas, indoor data usage, outdoor data usage, etc.), and the like. Further, in addition to the categorization of data usage, the categorization system may also determine or derive additional insights and include the same in the table. For instance, in the example of FIG. 3, the categorization system determines the number or count of child devices associated with each parent device, although it is contemplated that the categorization system may determine or derive any other suitable insights (e.g., device model, start date/subscription date, total data usage in the tethering and/or the non-tethering, total data usage in the 4G network and/or the 5G network, data usage per child device, data traffic type like TCP/UDP, data protocols like HTTPS/FTP, etc.) and include the same in the table. In addition, upon categorizing the user (further described below), the categorization system may also include the information of the categorized user (e.g., tethering user, non-tethering user, etc.) into the table. Furthermore, in some example implementations, instead of compiling and presenting the information in the table form, the categorization system may compile and present the information in any other suitable form, such as a list, a graph, a chart, a histogram, a written report, a time-series animation, and the like.

According to example embodiments, in addition to categorizing the user data usage, the categorization system may be configured to categorize the users. In this regard, typical user categorization methods in the related art often rely on binary or crisp classifications, such as "tethering" and "non-tethering", which do not account for users who fall somewhere in between and may lead to inaccurate user categorization. Further, typical user categorization methods in the related art may be ineffective and inefficient in categorizing the users with multi-dimensional data (e.g., categorizing users based on data usage volume, time of day, application type, network type, etc.), as they often require discrete classifications that do not consider the relationship between different dimensions. Thus, instead of categorizing the users with typical user categorization methods, the categorization system may execute an approximate reasoning algorithm, such as a fuzzy-logic algorithm, to categorize the users, which allows for more nuanced and flexible classification when the user behavior or preference may be associated with multiple dimensions and the definition of "tethering user" and "non-tethering user" is not clear-cut.

Figure 4:
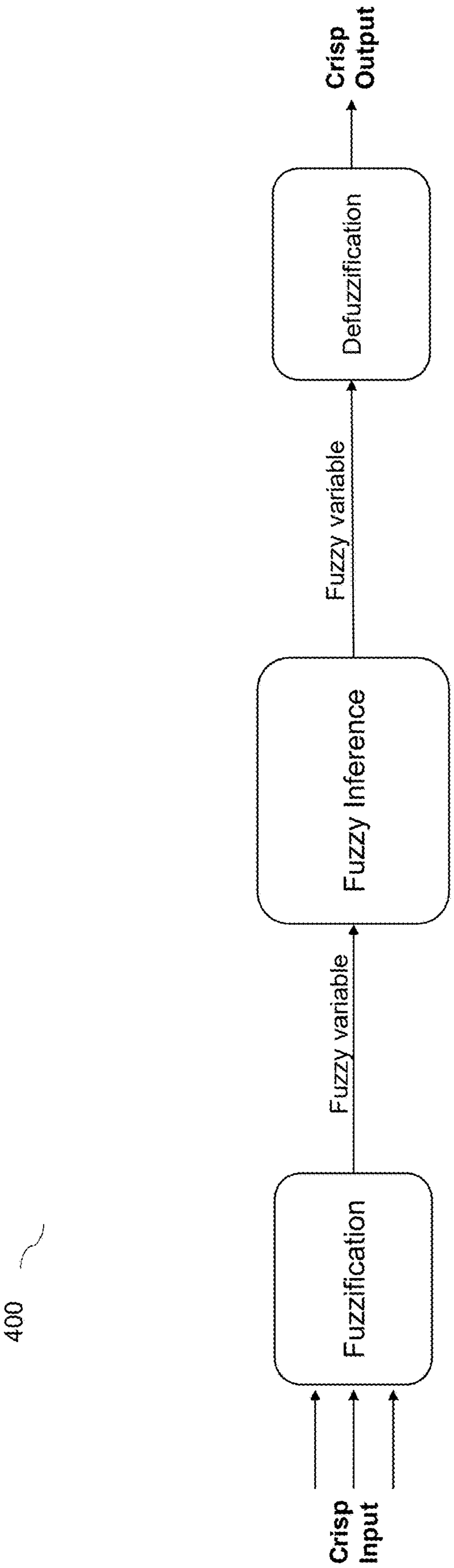
FIG. 4 illustrates a block diagram of an example fuzzy-logic algorithm for categorizing a user, according to one or more example embodiments.

FIG. 4 illustrates a block diagram of an example fuzzy-logic algorithm 400 for categorizing a user, according to one or more example embodiments. In some example implementations, the categorization system may execute the fuzzy-logic algorithm 400 to categorize users that have consumed data in tethering operations. For instance, in the example use case of FIG. 3, users of the first parent device and the second parent device will be further categorized, since these users have utilized the associated parent device to share the network connections with child devices in the tethering mode.

Generally, the categorization system may provide one or more parameters associated with the user to the fuzzy-logic algorithm (which may be presented or implemented in the form of an artificial intelligence (AI) model and/or a machine learning (ML) model), and the fuzzy-logic algorithm may process the inputted parameter(s) through the fuzzification operation, fuzzy inference operation, and defuzzification operation, to thereby provide an output associated with the category of the user.

The input parameter may include one or more of: user data usage, connection duration, number of connections, time of day, day of week, and any other suitable parameter that is associated with the users and is relevant for detecting tethering behavior/preference of the user. In this regard, the categorization system may obtain the input parameter (or the information for determining/deriving the input parameter) from the core network. Since the input parameter is in the form of specific and well-defined values that represent real-word data without any ambiguity or fuzziness, the input parameter may also be referred to as "crisp input".

The input parameter, upon being inputted to the fuzzy-logic algorithm, may be converted via the fuzzification operation into a fuzzy variable with corresponding membership functions. For example, the user data usage may be converted into fuzzy sets such as "High", "Medium", and "Low" based on the number of connections, while a fuzzy membership function assigns a degree of membership to the different user data usage (e.g., from the scale of 0 to 1, the value 0 means that the user data usage does not belong to the fuzzy set at all, the value between 0 and 1 represent partial membership, while the value 1 means full membership). Similarly, the connection duration may be converted into fuzzy sets like "Short", "Medium", "Long", the number of connections may be converted into fuzzy sets like "Few", "Several", "Many", the time of day may be converted into fuzzy sets like "Afternoon", "Evening", "Night", the day of the week may be converted into fuzzy sets like "weekday", "weekend", and the like. In this way, instead of having precise cut-offs (e.g., user data usage less than 600 MB is "High", etc.), the input parameter can partially belong to multiple fuzzy sets based on the fuzzy membership function (e.g., user data usage of 600 MB can be partially "Medium" and partially "High", etc.)

Referring still to FIG. 4, upon converting the input parameter(s) into the respective fuzzy variable(s), the converted fuzzy variable(s) may be processed via one or more fuzzy inference operations. According to example embodiments, one or more fuzzy rules may be applied to the fuzzy variable(s) to calculate or infer the corresponding fuzzy output(s). For instance, a fuzzy rule may include a set of "IF-THEN" rules to combine the fuzzy variables and determine the likelihood of the user being a tethering/non-tethering user (e.g., if the user data usage is "High" AND the connection duration is "Long" THEN the user is "likely tethering", if the user data usage is "High" AND the connection duration is "Medium" THEN the user is "possibly tethering", etc.) The fuzzy rule(s) allow the categorization system to make inferences based on combinations of the converted fuzzy variables and to output fuzzy variables based thereon. The outputted fuzzy variables may each include fuzzy sets that represent the likelihood of the user being a tethering/non-tethering user.

Subsequently, the fuzzy variables outputted by the fuzzy inference operations may be converted, via one or more defuzzification operations (e.g., centroid of area (COA) operation, bisector of area (BOA) operation, maximum membership principle (MMP) operation, etc.), into a crisp output that represents a clear categorization decision. For instance, a crisp output of "0.8" may indicate a high likelihood that the user prefers to utilize (or frequently utilizes) the associated device(s) for tethering. Accordingly, based on the crisp output, the categorization system may categorize the users into a "tethering user", a "non-tethering user", a "potential tethering user", and the like. In some example embodiments, the categorization system may further categorize the users according to the most relevant network type. For instance, a user that always consumes 4G tethering data may be categorized as a "4G tethering user", a user that always consumes 5G tethering data may be categorized as a "5G tethering user", a user that has a tendency of utilizing the 5G network for tethering operations may be categorized as a "potential 5G tethering user", and the like.

Although it is described hereinabove that the categorization system may be configured to categorize the users (e.g., tethering user, non-tethering user, potential tethering user, etc.) based on a fuzzy-logic algorithm, it is contemplated that the categorization system may also be configured to categorize the users based on any suitable approximate reasoning algorithm, in addition to or in alternative to the fuzzy-logic algorithm, without departing from the scope of the present disclosure.

According to example embodiments, the categorization system may be configured to provide a service to the user (via the UE, etc.) based on the categorized information. The categorized information may include a category of the data usage (e.g., tethering data, non-tethering data, 4G data, 5G data, or a combination thereof), a category of a user (e.g., a tethering user, a non-tethering user, a potential tethering user, a 4G user, a 5G user, or a combination thereof), and the like. The service may be a service targeted or optimized (or predetermined as optimal) for the categorization, and may include a data usage alert service, a data usage monitoring service, and/or any other suitable services.

According to example embodiments where the service includes the data usage alert service, the categorization system may be configured to determine or define, based on the categorized information, a condition for triggering/sending an alert associated with the data usage. The data usage alert may be delivered via various channels or in various forms. For instance, the alert may include an SMS alert, a notification in a mobile application, an email, an interactive voice response (IVR), and the like.

In some example implementations, the categorization system may determine or define (or may instruct another system or component to determine/define) a first threshold for triggering/sending a first alert associated with tethering data usage and a second threshold for triggering/sending a second alert associated with non-tethering data usage. Subsequently, the categorization may periodically (or continuously) monitor and categorize the data usage of a user, and may then trigger/send (or may instruct another system or component to trigger/send) one or more data usage alerts to the associated user. As a non-limiting example, the first threshold may be a first parameter (e.g., a first value, a first percentage, etc.) defining a usage limit of the tethering data, which may trigger the first data usage alert when the tethering data usage of the user has exceeded (or will soon exceed) the associated usage limit. On the other hand, the second threshold may be a second parameter (e.g., a second value, a second percentage, etc.) defining a usage limit of the non-tethering data, which may trigger the second data usage alert when the non-tethering data usage of the user has exceeded (or will soon exceed) the associated usage limit.

According to example embodiments where the optimized service includes the data usage monitoring service, the categorization system may be configured to monitor the data usage of a user, categorize the data usage, and present/report the information of the categorized data usage to the user. For instance, the categorization system may generate (or instruct another system or component to generate) a graphical user interface (GUI) that includes information of the categorized data usage (e.g., tethering data usage, non-tethering data usage, 4G data usage, 5G data usage, or a combination thereof), information of the associated devices (e.g., number of child devices in tethering mode, child IP addresses of the child devices, parent IP address of the parent device, device model, IMSI, etc.), information of the user (e.g., tethering user, non-tethering user, potential tethering user, start date/subscription date, active subscription plan, etc.), and any other suitable information. In some example implementations, the GUI may include one or more interactive elements (e.g., a button, a drop-down list, a slider, an icon, etc.) which, when being interacted (e.g., pressed, tapped, etc.) by the user, enable the user to customize how specifically the information should be presented in the GUI (e.g., a specific type of information should be presented, the information should be presented in table/list form, etc.)

Upon generating the GUI, the categorization system may display/present (or instruct another system or component to display/present) the generated GUI to the user in real-time (or near-real-time). In addition to or in alternative to GUI, the categorization system may also generate and present (or instruct another system or component to generate and present) a report that includes the information of the categorized data usage to the user. For instance, the report may include a table (e.g., Table 300 as illustrated in FIG. 3), a list, a graph, a chart, a histogram, a written report, and/or a time-series animation. To this end, comprehensive and detailed information of the data usage may be provided to the user, thereby allowing the user to effectively and accurately monitor the data usage and manage the data consumption.

In view of the above, example embodiments of the present disclosure effectively, efficiently, and accurately categorize data usage and the associated users in a telecommunication network. Specifically, the categorization system of example embodiments may utilize the information of the IP address associated with a user to categorize the data usage of the user into multiple categories (and sub-categories, in some example implementations). Further, the categorization system of example embodiments may execute an approximate reasoning algorithm (e.g., a fuzzy-logic algorithm) to categorize the users. Accordingly, the categorization system may take into consideration information or data from multiple dimensions when categorizing the data usage and the associated users, thereby increasing the accuracy, efficiency, and effectiveness of the categorization.

Ultimately, the categorized information may be utilized to provide an optimized or targeted service (e.g., a data usage alert service, a data usage monitoring service, etc.) to the users, thereby enhancing the user experiences and optimizing network resource allocation. Further, excess overhead in offering or providing services to miscategorized users can be avoided, thereby optimizing the network resource consumption. Furthermore, a data usage alert may be triggered or provided according to the type of data usage and/or the type of the user, thereby improving the effectiveness of the alert since the user may know the detailed reasoning that triggers the alert. Additionally, comprehensive and detailed data usage information may be provided to the users, thereby improving the effectiveness, efficiency, and accuracy of managing the data usage.

Example Operations

In the following, descriptions of the example operations according to one or more example embodiments are described. In this regard, it can be understood that one or more operations described herein may be performed by the categorization system (or a device implementing the categorization system). For example, the device may include a processor and a storage medium storing computer-readable instructions for implementing the categorization system (or the associated operations). In this case, the processor may be configured to execute the computer-readable instructions to perform one or more operations described herein. Descriptions of an example device that may be configured to implement the example embodiments are described below with reference to FIG. 6.

Figure 5A:
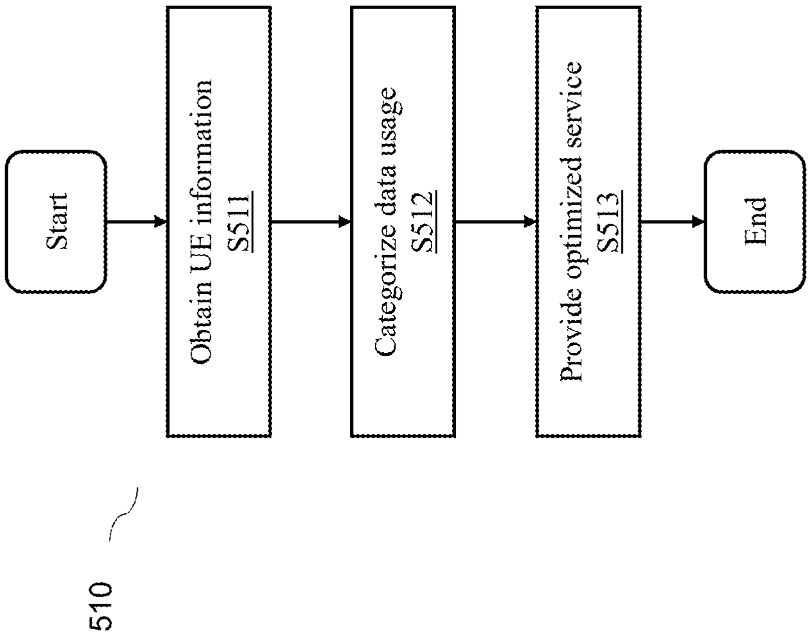
FIG. 5A illustrates a block diagram of a method for categorizing data usage in a telecommunication network, according to one or more example embodiments.

FIG. 5A illustrates a block diagram of a method 510 for categorizing data usage in a telecommunication network, according to one or more example embodiments. As illustrated in FIG. 5A, at operation S511, the categorization system may be configured to obtain information of a UE in the telecommunication network. The information may include information of an IP address associated with the UE and information of data usage associated with the UE. The IP address may include a parent IP address associated with the UE and a child IP address associated with the parent IP address.

According to example embodiments, the categorization system may obtain the UE information from a core network of the telecommunication network (e.g., EPC network, 5GC network, etc.) For instance, according to example embodiments, the core network may include the EPC network, and the EPC network may include an MME and an SGW. In this case, the categorization system may be configured to obtain the information of the IP address by: obtaining, from the MME via an S1-C interface, the parent IP address, and obtaining, from the SGW via an S1-U interface, the child IP address.

Referring still to FIG. 5A, at operation S512, the categorization system may be configured to categorize the data usage of the UE. According to example embodiments, the categorization system may categorize, based on the IP address of the UE, the data usage into a parent category and a child category. In this regard, the parent category may be associated with data usage in a non-tethering operation (or when the UE is in non-tethering mode), while the child category may be associated with data usage in a tethering operation (or when the UE is in tethering mode).

According to example embodiments where the IP address obtained from the core network includes the parent IP address and the child IP address, the categorization system may categorize the data usage by: determining a first portion of the data usage that is associated with the parent IP address and a second portion of the data usage that is associated with the child IP address; and categorizing the first portion of the data usage into the parent category and the second portion of the data usage into the child category. Further, in some example embodiments, the parent category may include a first sub-category that is associated with 5G data usage in the non-tethering operation and a second sub-category that is associated with 4G data usage in the non-tethering operation. Additionally or alternatively, the child category may include a first sub-category that is associated with 5G data usage in the tethering operation and a second sub-category that is associated with 4G data usage in the tethering operation.

At operation S513, the categorization system may be configured to provide, based on the categorization of the data usage, a service to the user. The service may include at least one of: a data usage alert service and a data usage monitoring service.

Further descriptions of the example operations for obtaining the UE information, categorizing the data usage, and providing the service, have been described above with reference to FIGS. 2A-4, thus redundant descriptions associated therewith may be omitted below for conciseness.

Figure 5B:
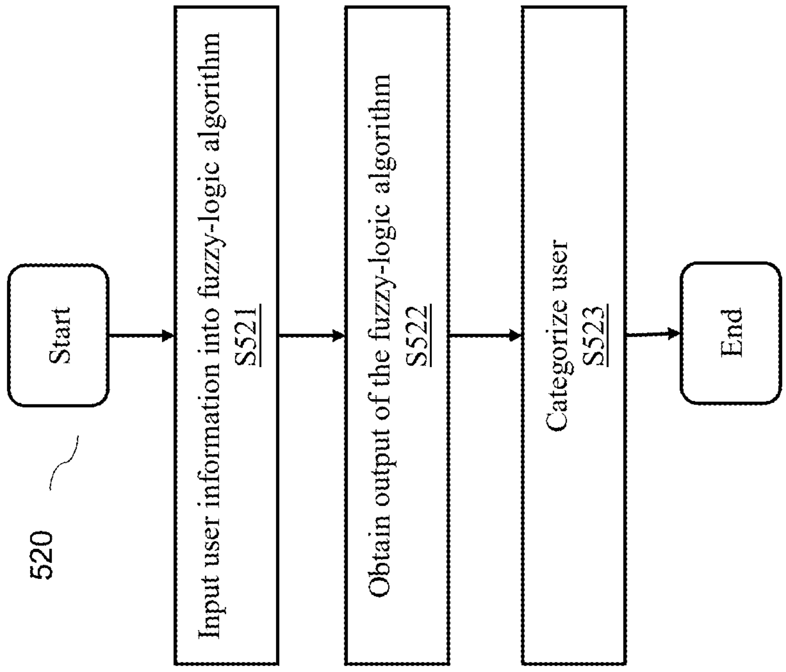
FIG. 5B illustrates a block diagram of an example method for categorizing a user in a telecommunication network, according to one or more example embodiments.

Referring next to FIG. 5B, which illustrates a block diagram of an example method 520 for categorizing a user in a telecommunication network, according to one or more example embodiments. Generally, the categorization system may be configured to execute an approximate reasoning algorithm (e.g., a fuzzy-logic algorithm) to perform method 520 to thereby categorize the user into one of: a tethering user, a potential tethering user, and a non-tethering user.

According to example embodiments, the user that is being categorized in the operations of method 520 may be associated with the UE that has consumed data in tethering operation (i.e., the user has enabled the tethering mode of the UE to share the network connection of the UE to other devices in the past). Further, method 520 may either be performed subsequent to method 510, or be performed independently from method 510.

Referring to FIG. 5B, at operation S521, the categorization system may be configured to input information or parameters associated with the user into a fuzzy-logic algorithm (or an AI/ML model associated therewith). The user information/parameters may be presented in the form of crisp values.

At operation S522, the categorization system may be configured to obtain the output of the fuzzy-logic algorithm. For instance, the inputted information/parameters (in the form of crisp values) may be processed (e.g., via one or more fuzzification operations and one or more fuzzy inference operations) and converted into one or more fuzzy variables. Accordingly, the one or more fuzzy variables may be converted (e.g., via one or more defuzzification operations) back to the form of crisp values. In this case, the categorization system may obtain the outputted crisp values at operation S522. Upon obtaining the output (e.g., crisp values) from the fuzzy-logic algorithm, at operation S523, the categorization system may categorize the user based on the obtained output (e.g., crisp values obtained from the fuzzy-logic algorithm).

In some example embodiments, instead of the categorization system executing the fuzzy-logic algorithm, the fuzzy-logic algorithm may be implemented in a fuzzy inference system. In this case, the categorization system may provide the user information/parameters to the fuzzy inference system (at operation S521) and may obtain the outputted crisp values from the fuzzy inference system.

Upon categorizing the data usage (via method 510) and/or categorizing the user (via method 520), the categorization system may be configured to utilize the categorized information (e.g., information of the categorized data usage, information of the categorized user, etc.) to thereby provide a service (e.g., an optimized/targeted service like an optimized data usage alert service and/or an optimized data usage monitoring service, etc.) to the user (via the UE). Alternatively or additionally, the categorization system may provide the categorized information to another system/component and then instruct the another system/component to provide the service to the user based on the categorized information.

Descriptions of the example parameters and operations associated with the fuzzy-logic algorithm, as well as the operations for providing a service to a user, have been described above with reference to FIGS. 2A-4, thus redundant descriptions associated therewith may be omitted below for conciseness.

In view of the above, example embodiments of the present disclosure provide methods and operations for effectively, efficiently, and accurately categorizing data usage and the associated users in a telecommunication network. Specifically, example embodiments of the present disclosure may take into consideration information or data from multiple dimensions when categorizing the data usage and the associated users, thereby increasing the accuracy, efficiency, and effectiveness of the categorization. Ultimately, example embodiments of the present disclosure may utilize the categorized information to provide an optimized or targeted service to the users, (thereby enhancing the user experiences and optimizing network resource allocation), avoid excess overhead in offering or providing services to miscategorized users (thereby optimizing the network resources consumption), trigger/provide a data usage alert according to the type of data usage and/or the type of the user (thereby improving the effectiveness of the alert since the user may know the detailed reasoning that triggers the alert), and provide a comprehensive and detailed data usage information to the users (thereby improving the effectiveness, efficiency, and accuracy of managing the data usage).

Example Device

As described above, categorization system of the example embodiments (or the operations associated therewith) may be implemented in one or more devices or hardware components, such as one or more servers, and the like. In the following, descriptions of a device in which the example embodiments may be implemented are provided.

Figure 6:
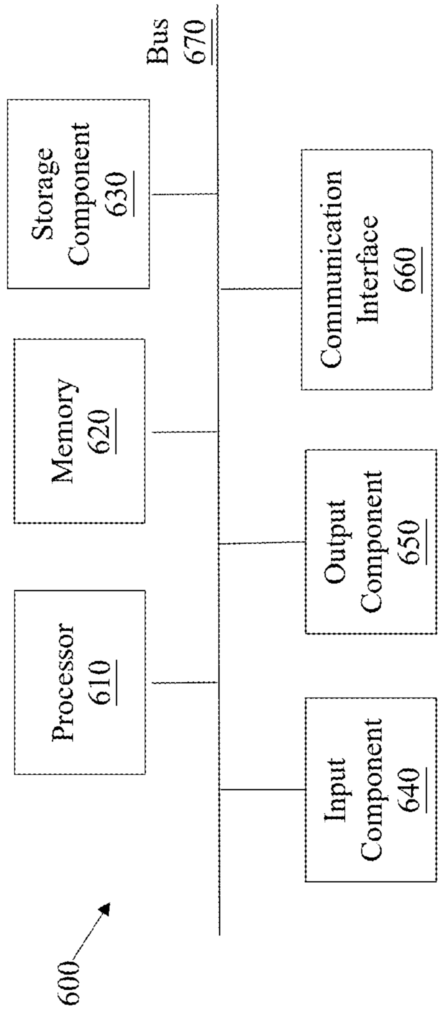
FIG. 6 illustrates a block diagram of an example device for implementing one or more example embodiments.

FIG. 6 illustrates an embodiment of a device 600. As shown in FIG. 6, the device 600 may include a processor 610, a memory 620, a storage component 630, an input component 640, an output component 650, a communication interface 660, and a bus 670.

The processor 610, as used herein, means any type of computational circuit that may comprise hardware elements and software elements. The processor 610 may be embodied as a multi-core processor, a single core processor, or a combination of one or more multi-core processors and/or one or more single core processors, a distributed processing system, or the like. The processor 610 may be a Central Processing Unit (CPU), a graphics processing unit (GPU), an accelerated processing unit (APU), an application-specific integrated circuit (ASIC), or another type of processing component.

Memory 620 includes a non-transitory computer readable medium. Memory 620 includes a random-access memory (RAM), a read only memory (ROM), and/or another type of dynamic or static storage device (e.g., a flash memory, a magnetic memory, and/or an optical memory) that stores information and/or instructions for use by processor 610. The memory 620 comprises machine-readable instructions which are executable by the processor 610. These machine-readable instructions when executed by the processor 610 cause the processor 610 to perform one or more method steps of an embodiment described above.

Storage component 630 stores information and/or software related to the operation and use of the device 600. For example, storage component 630 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 640 is configured to receive information, such as user input. For example, the input component 640 may include, but not be limited to, a touch screen display, a keyboard, a keypad, a mouse, a button, a switch, and/or a microphone. Additionally, or alternatively, the input component 640 may include a sensor for sensing information (e.g., a global positioning system (GPS), an accelerometer, a gyroscope, and/or an actuator).

Output component 650 is configured to provide output information from the device 600. For example, the output component 650 may be, but not limited to, a display, a speaker, instructions to an external device, and/or one or more light-emitting diodes (LEDs).

Communication interface 660 is an interface that provides a communication connection to other devices, such as external devices and internal devices. The connection by the communication interface 660 can be a wired connection, a wireless connection, or a combination of wired and wireless connections, and can be a direct connection or an indirect connection via a communication network that exists between the device 600 and other devices. In other words, the standard of the communication interface 660 is not limited.

The bus 670 acts as an interconnect between the processor 610, the memory 620, the storage component 630, the input component 640, the output component 650, and the communication interface 660 of the device 600. The bus 670 may include a wired interconnection or a wireless interconnection.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600. Further, one or more method steps described in any of the embodiments may be performed utilizing a plurality of devices 600 in communication with one another.

Various Aspects of Embodiments

It is contemplated that the example embodiments described hereinabove with reference to FIG. 1 to FIG. 6 are merely examples of possible embodiments of the present disclosure, and are not intended to limit or restrict the scope of the present disclosure.

Specifically, the foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a device (e.g., network node, server, etc.), a system, a method, and/or a computer-readable medium at any possible technical detail level of integration. Further, one or more of the above components described above may be implemented as instructions stored on a computer-readable medium and executable by at least one processor (and/or may include at least one processor). The computer-readable medium may include a computer-readable non-transitory storage medium (or media) having computer-readable program instructions thereon for causing a processor to carry out operations.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), electrically erasable programmable read-only memory (EEPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program code/instructions for carrying out operations may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages.

The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects or operations.

These computer-readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer-readable media according to various embodiments. In this regard, each block in the flowchart or block diagrams may represent a module, segment, or portion of instructions, which comprises one or more executable instructions for implementing the specified logical function(s). The method, computer system, and computer-readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limited to the implementations. Thus, the operation and behavior of the systems and/or methods were described herein without reference to specific software code—it is understood that software and hardware may be designed to implement the systems and/or methods based on the description herein.

In view of the above, various further respective aspects and features of embodiments of the present disclosure may be defined by the following items:

Item [1]: A system configured to: obtain, from a core network of a telecommunication network, information of an internet protocol (IP) address associated with a user equipment (UE) in the telecommunication network and information of data usage associated with the UE; categorize, based on the IP address, the data usage into a parent category and a child category, wherein the parent category may be associated with data usage in a non-tethering operation and the child category may be associated with data usage in a tethering operation; provide, based on the categorization of the data usage, a service to the UE.

Item [2]: The system according to item [1], wherein the core network may include an evolved packet core (EPC) network that may include a mobility management entity (MME) and a serving gateway (SGW), Item [3]: The system according to item [2], wherein the IP address may include a parent IP address associated with the UE and a child IP address associated with the parent IP address, and wherein the system may be configured to obtain the information of the IP address by: obtaining, from the MME via an S1-Control Plane (S1-C) interface, the parent IP address; and obtaining, from the SGW via an S1-User Plane (S1-U) interface, the child IP address.

Item [4]: The system according to item [3], wherein the system may be configured to categorize the data usage by: determining a first portion of the data usage that is associated with the parent IP address and a second portion of the data usage that is associated with the child IP address; and categorizing the first portion of the data usage into the parent category and the second portion of the data usage into the child category.

Item [5]: The system according to any one of items [1]-[4], wherein the parent category may include a first sub-category and a second sub-category, and wherein the first sub-category may be associated with fifth-generation (5G) data usage in the non-tethering operation and the second sub-category may be associated with fourth-generation (4G) data usage in the non-tethering operation.

Item [6]: The system according to any one of items [1]-[5], wherein the child category may include a first sub-category and a second sub-category, and wherein the first sub-category may be associated with 5G data usage in the tethering operation and the second sub-category may be associated with 4G data usage in the tethering operation.

Item [7]: The system according to any one of items [1]-[6], wherein the system may be further configured to execute an approximate reasoning algorithm to categorize a user of the UE into one of: a tethering user, a potential tethering user, and a non-tethering user Item [8]: The system according to any one of items [1]-[7], wherein the service may include at least one of: a data usage alert service and a data usage monitoring service.

Item [9]: A method including: obtaining, from a core network of a telecommunication network, information of an internet protocol (IP) address associated with a user equipment (UE) in the telecommunication network and information of data usage associated with the UE; categorizing, based on the IP address, the data usage into a parent category and a child category, wherein the parent category may be associated with data usage in a non-tethering operation and the child category may be associated with data usage in a tethering operation; and providing, based on the categorization of the usage, a service to the UE.

Item [10]: The method according to item [9], wherein the core network may include an evolved packet core (EPC) network that may include a mobility management entity (MME) and a serving gateway (SGW).

Item [11]: The method according to item [10], wherein the IP address may include a parent IP address associated with the UE and a child IP address associated with the parent IP address, wherein the obtaining the information of the IP address may include: obtaining, from the MME via an S1-Control Plane (S1-C) interface, the parent IP address; and obtaining, from the SGW via an S1-User Plane (S1-U) interface, the child IP address.

Item [12]: The method according to item [11], wherein the categorizing the data usage may include: determining a first portion of the data usage that is associated with the parent IP address and a second portion of the data usage that is associated with the child IP address; and categorizing the first portion of the data usage into the parent category and the second portion of the data usage into the child category.

Item [13]: The method according to any one of items [9]-[12], wherein the parent category may include a first sub-category and a second sub-category, and wherein the first sub-category may be associated with fifth generation (5G) data usage in the non-tethering operation and the second sub-category may be associated with fourth generation (4G) data usage in the non-tethering operation.

Item [14]: The method according to any one of items [9]-[13], wherein the child category may include a first sub-category and a second sub-category, and wherein the first sub-category may be associated with 5G data usage in the tethering operation and the second sub-category may be associated with 4G data usage in the tethering operation.

Item [15]: The method according to any one of items [9]-[14], wherein the method may further include: executing an approximate reasoning algorithm to categorize a user of the UE into one of: a tethering user, a potential tethering user, and a non-tethering user.

Item [16]: The method according to any one of items [9]-[15], wherein the service may include at least one of a data usage alert service and a data usage monitoring service.

Item [17]: A non-transitory computer-readable recording medium may have recorded thereon instructions executable by a system to cause the system to perform a method including: obtaining, from a core network of a telecommunication network, information of an internet protocol (IP) address associated with a user equipment (UE) in the telecommunication network and information of data usage associated with the UE; categorizing, based on the IP address, the data usage into a parent category and a child category, wherein the parent category may be associated with data usage in a non-tethering operation and the child category may be associated with data usage in a tethering operation; and providing, based on the categorization of the data usage, a service to the UE.

Item [18]: The non-transitory computer-readable recording medium according to item [17], wherein the core network may include an evolved packet core (EPC) network that may include a mobility management entity (MME) and a serving gateway (SGW).

Item [19]: The non-transitory computer-readable recording medium according to item [18], wherein the IP address may include a parent IP address associated with the UE and a child IP address associated with the parent IP address, and wherein the obtaining the information of the IP address may include: obtaining, from the MME via an S1-Control Plane (S1-C) interface, the parent IP address; and obtaining, from the SGW via an S1-User Plane (S1-U) interface, the child IP address.

Item [20]: The non-transitory computer-readable recording medium according to item [19], wherein the categorizing the data usage may include: determining a first portion of the data usage that is associated with the parent IP address and a second portion of the data usage that is associated with the child IP address; and categorizing the first portion of the data usage into the parent category and the second portion of the data usage into the child category.

Item [21]: The non-transitory computer-readable recording medium according to any one of items [17]-[20], wherein the parent category may include a first sub-category and a second sub-category, and wherein the first sub-category may be associated with fifth generation (5G) data usage in the non-tethering operation and the second sub-category may be associated with fourth generation (4G) data usage in the non-tethering operation.

Item [22]: The non-transitory computer-readable recording medium according to any one of items [17]-[21], wherein the child category may include a first sub-category and a second sub-category, and wherein the first sub-category may be associated with 5G data usage in the tethering operation and the second sub-category may be associated with 4G data usage in the tethering operation.

Item [23]: The non-transitory computer-readable recording medium according to any one of items [17]-[22], wherein the method may further include: executing an approximate reasoning algorithm to categorize a user of the UE into one of: a tethering user, a potential tethering user, and a non-tethering user Item [24]: The non-transitory computer-readable recording medium according to any one of items [17]-[23], wherein the service may include at least one of: a data usage alert service and a data usage monitoring service.

It can be understood that numerous modifications and variations of the present disclosure are possible in light of the above teachings. It will be apparent that within the scope of the appended clauses, the present disclosures may be practiced otherwise than as specifically described herein.

What is claimed is:

1. An information processing apparatus comprising:

at least one memory configured to store at least one program; and at least one processor configured to operate as instructed by the program, the program being configured to cause the at least one processor to:

obtain, from a core network of a telecommunication network, information of an internet protocol (IP) address associated with a user equipment (UE) in the telecommunication network and information of data usage associated with the UE;

categorize, based on the IP address, the data usage into a parent category and a child category, wherein the parent category is associated with data usage in a non-tethering operation and the child category is associated with data usage in a tethering operation;

provide, based on the categorization of the data usage, a service to the UE;

determine, based on the categorization of the data usage, a first threshold for triggering a first alert associated with data usage in the tethering operation and a second threshold for triggering a second alert associated with data usage in the non-tethering operation, and monitoring the categorized data usage and triggering at least one of the first alert or the second alert when the respective data usage exceeds the respective threshold; and provide a targeted service to the UE based on the category of the data usage, thereby avoiding excess overhead in offering or providing services to miscategorized users and optimizing network resource consumption.

2. The information processing apparatus according to claim 1, wherein the core network comprises an evolved packet core (EPC) network that comprises a mobility management entity (MME) and a serving gateway (SGW).

3. The information processing apparatus according to claim 2, wherein the IP address comprises a parent IP address associated with the UE and a child IP address associated with the parent IP address, and wherein the system is configured to obtain the information of the IP address by:

obtaining, from the MME via an S1-Control Plane (S1-C) interface, the parent IP address; and obtaining, from the SGW via an S1-User Plane (S1-U) interface, the child IP address.

4. The information processing apparatus according to claim 1, wherein the program is configured to cause at least one of the at least one processor to categorize the data usage by:

determining a first portion of the data usage that is associated with the parent IP address and a second portion of the data usage that is associated with the child IP address; and categorizing the first portion of the data usage into the parent category and the second portion of the data usage into the child category.

5. The information processing apparatus according to claim 1, wherein the parent category comprises a first sub-category and a second sub-category, and wherein the first sub-category is associated with fifth-generation (5G) data usage in the non-tethering operation and the second sub-category is associated with fourth-generation (4G) data usage in the non-tethering operation.

6. The information processing apparatus according to claim 1, wherein the child category comprises a first sub-category and a second sub-category, and wherein the first sub-category is associated with 5G data usage in the tethering operation and the second sub-category is associated with 4G data usage in the tethering operation.

7. The information processing apparatus according to claim 1, wherein the program is configured to cause at least one of the at least one processor to execute an approximate reasoning algorithm to categorize a user of the UE into one of: a tethering user, a potential tethering user, and a non-tethering user.

8. The system according to claim 1, wherein the service comprises at least one of: a data usage alert service and a data usage monitoring service.

9. A method comprising:

obtaining, from a core network of a telecommunication network, information of an internet protocol (IP) address associated with a user equipment (UE) in the telecommunication network and information of data usage associated with the UE;

categorizing, based on the IP address, the data usage into a parent category and a child category, wherein the parent category is associated with data usage in a non-tethering operation and the child category is associated with data usage in a tethering operation;

providing, based on the categorization of the data usage, a service to the UE;

determining, based on the categorization of the data usage, a first threshold for triggering a first alert associated with data usage in the tethering operation and a second threshold for triggering a second alert associated with data usage in the non-tethering operation, and monitoring the categorized data usage and triggering at least one of the first alert or the second alert when the respective data usage exceeds the respective threshold; and providing a targeted service to the UE based on the category of the data usage, thereby avoiding excess overhead in offering or providing services to miscategorized users and optimizing network resource consumption.

10. The method according to claim 9, wherein the core network comprises an evolved packet core (EPC) network that comprises a mobility management entity (MME) and a serving gateway (SGW).

11. The method according to claim 10, wherein the IP address comprises a parent IP address associated with the UE and a child IP address associated with the parent IP address, and wherein the obtaining the information of the IP address comprises:

obtaining, from the MME via an S1-Control Plane (S1-C) interface, the parent IP address; and obtaining, from the SGW via an S1-User Plane (S1-U) interface, the child IP address.

12. The method according to claim 11, wherein the categorizing the data usage comprises:

determining a first portion of the data usage that is associated with the parent IP address and a second portion of the data usage that is associated with the child IP address; and categorizing the first portion of the data usage into the parent category and the second portion of the data usage into the child category.

13. The method according to claim 9, wherein the parent category comprises a first sub-category and a second sub-category, and wherein the first sub-category is associated with fifth generation (5G) data usage in the non-tethering operation and the second sub-category is associated with fourth generation (4G) data usage in the non-tethering operation.

14. The method according to claim 9, wherein the child category comprises a first sub-category and a second sub-category, and wherein the first sub-category is associated with 5G data usage in the tethering operation and the second sub-category is associated with 4G data usage in the tethering operation.

15. The method according to claim 9, further comprising:

executing an approximate reasoning algorithm to categorize a user of the UE into one of: a tethering user, a potential tethering user, and a non-tethering user.

16. The method according to claim 9, wherein the service comprises at least one of: a data usage alert service and a data usage monitoring service.

17. A non-transitory computer-readable recording medium having recorded thereon instructions executable by a system to cause the system to perform a method comprising:

obtaining, from a core network of a telecommunication network, information of an internet protocol (IP) address associated with a user equipment (UE) in the telecommunication network and information of data usage associated with the UE;

categorizing, based on the IP address, the data usage into a parent category and a child category, wherein the parent category is associated with data usage in a non-tethering operation and the child category is associated with data usage in a tethering operation;

providing, based on the categorization of the data usage, a service to the UE;

determining, based on the categorization of the data usage, a first threshold for triggering a first alert associated with data usage in the tethering operation and a second threshold for triggering a second alert associated with data usage in the non-tethering operation, and monitoring the categorized data usage and triggering at least one of the first alert or the second alert when the respective data usage exceeds the respective threshold; and providing a targeted service to the UE based on the category of the data usage, thereby avoiding excess overhead in offering or providing services to miscategorized users and optimizing network resource consumption.

18. The non-transitory computer-readable recording medium according to claim 17, wherein the core network comprises an evolved packet core (EPC) network that comprises a mobility management entity (MME) and a serving gateway (SGW).

19. The non-transitory computer-readable recording medium according to claim 18, wherein the IP address comprises a parent IP address associated with the UE and a child IP address associated with the parent IP address, and wherein the obtaining the information of the IP address comprises:

obtaining, from the MME via an S1-Control Plane (S1-C) interface, the parent IP address; and obtaining, from the SGW via an S1-User Plane (S1-U) interface, the child IP address.

20. The non-transitory computer-readable recording medium according to claim 19, wherein the categorizing the data usage comprises:

determining a first portion of the data usage that is associated with the parent IP address and a second portion of the data usage that is associated with the child IP address; and categorizing the first portion of the data usage into the parent category and the second portion of the data usage into the child category.

* * * * *